(12) United States Patent
Kurokawa et al.

(10) Patent No.: US 10,084,887 B2
(45) Date of Patent: *Sep. 25, 2018

(54) DEVICE AND METHOD FOR CONTROLLING REMOTE PROCEDURE CALL

(71) Applicant: International Business Machines Corporation, Armonk, NY (US)

(72) Inventors: Hiroshi Kurokawa, Tokyo (JP); Takahisa Mizuno, Tokyo (JP); Tomohiro Shioya, Tokyo (JP); Sayaka Tamai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/485,506

(22) Filed: Apr. 12, 2017

(65) Prior Publication Data

US 2017/0223141 A1    Aug. 3, 2017

Related U.S. Application Data

(63) Continuation of application No. 14/689,076, filed on Apr. 17, 2015, now Pat. No. 9,665,417.

(30) Foreign Application Priority Data

May 13, 2014    (JP) .................................. 2014-099583

(51) Int. Cl.
*H04L 29/06* (2006.01)
(52) U.S. Cl.
CPC .............. *H04L 67/40* (2013.01); *H04L 67/42* (2013.01)

(58) Field of Classification Search
CPC ....................................................... H04L 67/42
(Continued)

(56) References Cited

U.S. PATENT DOCUMENTS 7,069,543 B2 * 6/2006 Boucher ................. G06F 9/542
                                                    714/E11.008
8,036,871 B1   10/2011 Clune et al.
(Continued)

FOREIGN PATENT DOCUMENTS

JP     09185516 A    7/1997
JP     11212780 A    8/1999
(Continued)

OTHER PUBLICATIONS

"Lightweight Remote Procedure Call"—Anderson et al, University of Washington, Feb. 1990 https://www.cs.rise.edu/~alc/comp520/papers/Bershad_et_al.pdf.*

(Continued)

*Primary Examiner* — Randy Scott
(74) *Attorney, Agent, or Firm* — Heather S. Chatterton

(57) ABSTRACT

Controlling a remote procedure call from a client computer to a server computer, the client computer extracts a periodic remote procedure call from among a plurality of remote procedure calls from the client computer and extracts a non-periodic remote procedure call from among the plurality of remote procedure calls from the client computer. The client computer identifies a first information associated with the extracted periodic remote procedure call that is an item whose value is determined to represent data targeted by the periodic remote procedure call. The client computer identifies a second information associated with the extracted non-periodic remote procedure call that is a targeted data value of the item, and sets a priority level, used to select for (Continued)

execution the periodic procedure call, based on the first information and the second information.

20 Claims, 9 Drawing Sheets

(58) Field of Classification Search
USPC ........ 709/202, 203, 205, 217, 219; 719/310, 719/312, 313, 330; 717/105, 127, 158
See application file for complete search history.

(56) References Cited

U.S. PATENT DOCUMENTS

| | | |
|---|---|---|
| 8,607,067 B1 | 12/2013 | Janse van Rensburg et al. |
| 9,032,380 B1 | 5/2015 | Ruthramoorthy et al. |
| 2005/0273792 A1 | 12/2005 | Inohara et al. |
| 2013/0067429 A1* | 3/2013 | Jang .......................... G06F 8/36 717/105 |
| 2015/0331729 A1 | 11/2015 | Kurokawa et al. |

FOREIGN PATENT DOCUMENTS

| | | |
|---|---|---|
| JP | 11238027 A | 8/1999 |
| JP | 2008059494 A | 3/2008 |
| JP | 2008198158 A | 8/2008 |
| JP | 2009251665 A | 10/2009 |
| JP | 2010097594 A | 4/2010 |
| JP | 2013030031 A | 2/2013 |

OTHER PUBLICATIONS

Notification of Reasons for Refusal, Patent Application No. 2014-099583, Date of Drafting: Apr. 25, 2016, 7 pages.
Decision to Grant a Patent, Patent Application No. 2014-099583, Date of Drafting: Jun. 30, 2016, 6 pages.
List of IBM Patents or Patent Applications Treated as Related, dated Apr. 11, 2017, pp. 1-2.
Application No. 2014-099583 (Japan), titled "Device and Method for Controlling Remote Procedure Call," filed May 13, 2014, 38 pages.
Kurokawa et al., "Device and Method for Controlling Remote Procedure Call", filed Jan. 23, 2017, U.S. Appl. No. 15/412,300.
Seymour et al., "Overview of GridRPC: A Remote Procedure Call API for Grid Computing", University of Tennessee Knoxville, Sep. 2002, http://www.icl.utk.edu/sites/icl/files/publications/2002/icl-utk-182-2002.pdf, 5 pages.
Unknown, "Remote Procedure Calls", Department of Computer Science, University of Massachusetts, Mar. 2007, 9 pages. http://lass.cs.umass.edu/~shenoy/courses/spring07/lectures/Lec074.pdf.

\* cited by examiner

| PARAMETER 1 | PARAMETER 2 | PARAMETER 3 | PARAMETER 4 |
|---|---|---|---|
| A1 | A2 | A3 | A4 |
| A1 | B2 | A3 | A4 |
| A1 | C2 | A3 | A4 |
| A1 | ⋮ | A3 | A4 |
| B1 | A2 | A3 | B4 |
| B1 | A2 | B3 | B4 |
| C1 | A2 | B3 | C4 |

FIG. 5

```
http://iies03:8390/ESAdmin/api/v10/admin/indexer?method=getIndexBuildState collectionId     col_kurokawa
output           json
sessionToken     06a93c46-f719-49c2-bad1-a72f083fbe7b-1382123521207795713
```

```
http://iies03:8390/ESAdmin/api/v10/admin/indexer?method=getIndexBuildState collectionId     shioya_public_01
output           json
sessionToken     06a93c46-f719-49c2-bad1-a72f083fbe7b-1382123521207795713
```

```
http://iies03:8390/ESAdmin/api/v10/admin/indexer?method=getIndexBuildState collectionId     mizuno_public_02
output           json
sessionToken     06a93c46-f719-49c2-bad1-a72f083fbe7b-1382123521207795713
```

FIG. 6

DEVICE AND METHOD FOR CONTROLLING REMOTE PROCEDURE CALL

CROSS REFERENCE

The present application claims the benefit of priority to Japanese Patent Application 2014-099583, filed on May 13, 2014, which is incorporated herein by reference in its entirety.

BACKGROUND

The present invention relates generally to controlling a remote procedure call. In particular, the present invention relates to controlling a remote procedure call from a client to a server.

Executions of a plurality of remote procedure calls from clients to a server may be requested almost simultaneously. In some cases, however, there is an upper limit for the number of remote procedure calls that can be simultaneously executed or the number of processes based on remote procedure calls that can be simultaneously executed. In such a case, selecting which remote procedure call is to be used or which process based on the remote procedure call is to be used is a problem.

Japanese patent application publication JP2009251665, titled "COMMUNICATION SYSTEM", teaches a technique for increasing the number of simultaneous sessions to be more than or equal to a predetermined maximum number. It discloses a technique in which a computer specifies, for each device, a waiting time for a reply to be issued, which is a time from when a request is received to when a reply is issued, and a waiting time for a next request to be issued, which is a time from when the reply is received to when the next request is issued, and transmits, in a case where there is not a control request when a request is received from one device, a reply indicating a waiting time for a next request to be issued after a waiting time for a reply to be issued for the device has elapsed; and, upon receiving the reply, each device transmits a next request after the waiting time for the next request to be issued indicated by the reply has elapsed.

Japanese patent application JP11212780, titled "MONITORING CONTROL SYSTEM APPLICATION GROUP DEVELOPMENT METHOD, AND APPLICATION TEMPLATE DEVELOPMENT SUPPORT DEVICE", teaches a technique relating to an application programming interface (API) call, which is an example of a remote procedure call, in which an application source code storage unit stores individual source codes of an application group; a call transition count unit reads, for each application, an application source code and counts the number of API function call transitions; a call transition count storage unit stores the count result as a transition matrix for each application; a call transition common count unit reads and compares transition matrices for each application and counts the number of API function call transition candidates that are common among application groups; and a call transition common count storage unit stores the count result as a common transition matrix.

Japanese patent application publication JP2008059494, titled "MIDDLEWARE SELECTION CONTROLLER" teaches a technique in which an information terminal downloads a new application program and middleware from an external information provider and installs them, and when the application program is started, the information terminal preferentially selects and loads middleware that enhances the execution performance of the application program from a loadable middleware group, in consideration of both the performance value of a function group provided by the middleware to the application program and usage of the application program by a user.

In the above-described case where executions of a plurality of remote procedure calls from clients to a server are requested almost simultaneously, it is desirable to select a remote procedure call based on a mode of the remote procedure call or a mode of a process based on the remote procedure call that considers an interest of a user. Various embodiments of the present invention determine a mode of a remote procedure call or a mode of a process based on the remote procedure call that considers of an interest of a user.

SUMMARY

Embodiments of the present invention disclose a method, computer program product, and system for controlling a remote procedure call from a client computer to a server computer. The client computer extracts a periodic remote procedure call from among a plurality of remote procedure calls from the client computer and extracts a non-periodic remote procedure call from among the plurality of remote procedure calls from the client computer. The client computer identifies a first information associated with the extracted periodic remote procedure call that is an item whose value is determined to represent data targeted by the periodic remote procedure call. The client computer identifies a second information associated with the extracted non-periodic remote procedure call that is a targeted data value of the item, and sets a priority level, used to select for execution the periodic procedure call, based on the first information and the second information.

In another aspect of the present invention, the client computer selects the remote procedure call to execute, from among the plurality of remote procedure calls, based on the priority level.

In another aspect of the present invention, a device controls a remote procedure call from a client to a server. The device includes an extracting unit configured to extract, from among remote procedure calls from the client to the server, a regular remote procedure call and an irregular remote procedure call; and a determining unit configured to determine, regarding a remote procedure call from the client to the server, either of a mode of the remote procedure call and a mode of a process based on the remote procedure call, by using first information obtained through the regular remote procedure call and second information obtained through the irregular remote procedure call.

In this device, the determining unit may use, as the second information, information representing specific data targeted by the irregular remote procedure call. In this case, the determining unit may use, as the first information, information representing an item in which information representing data targeted by the regular remote procedure call is set, and may determine, as the specific data, data represented by information set in the item in the irregular remote procedure call. In these cases, the determining unit may determine, regarding a regular remote procedure call from the client to the server, either of a mode of the regular remote procedure call and a mode of a process based on the regular remote procedure call so that a specific regular remote procedure call targeting the specific data is distinguished from other regular remote procedure calls.

In another aspect of the present invention, determining a mode of a remote procedure call from the client to the server, the determining unit may determine, as the mode, a degree of priority of the remote procedure call, and, in a case of determining a mode of a process based on the remote procedure call, the determining unit may determine, as the mode, a degree of priority of the process based on the remote procedure call.

In another aspect of the present invention, a device controls a remote procedure call from a client to a server. The device includes an extracting unit configured to extract, from among remote procedure calls from the client to the server, a regular remote procedure call and an irregular remote procedure call; an estimating unit configured to estimate an item in which a value representing data targeted by the regular remote procedure call is set; an identifying unit configured to identify specific data, the specific data being indicated by the value set in the item in the irregular remote procedure call and targeted by the irregular remote procedure call; and a determining unit configured to determine, regarding a regular remote procedure call from the client to the server, either of a mode of the regular remote procedure call and a mode of a process based the regular remote procedure call so that a specific regular remote procedure call targeting the specific data is given higher priority than other regular remote procedure calls.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5 depicts an exemplary API parameter table, in accordance with an embodiment of the present invention;

FIG. 6 depicts exemplary API parameter items and exemplary parameter values, in accordance with an embodiment of the present invention;

DETAILED DESCRIPTION

Hereinafter, an embodiment of the present invention will be described with reference to the attached drawings.

In an exemplary embodiment, there may be a client demand for monitoring a state of a system operating in a server by regularly calling a stateless remote API, such as a RESTful API, from a web browser (hereinafter simply referred to as a "browser"). In various embodiments, regular API calls may be simultaneously executed.

Figure 1:
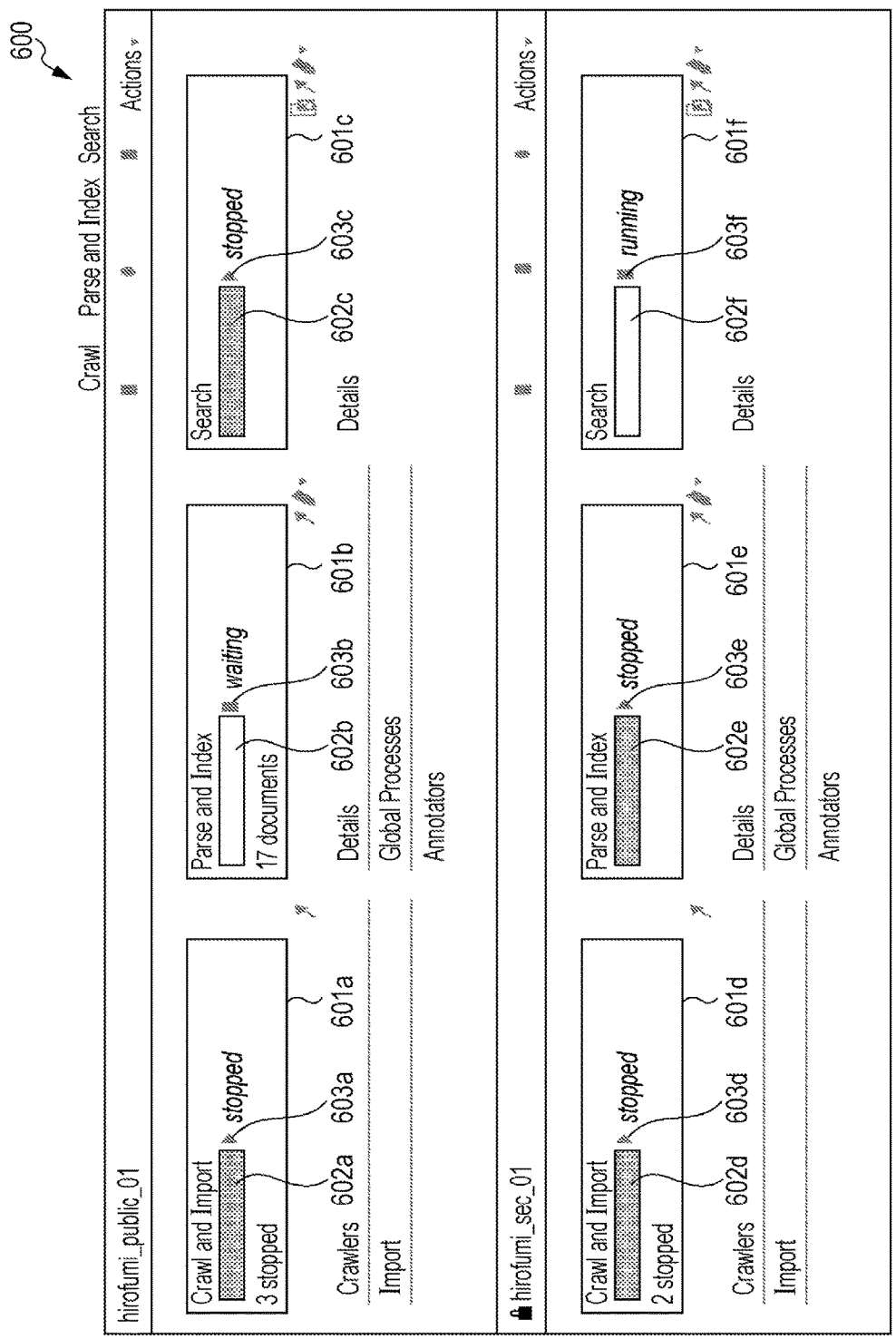
FIG. 1 depicts an exemplary dashboard user interface (UI), in accordance with an embodiment of the present invention.

FIG. 1 depicts an exemplary dashboard user interface (UI) 600, in accordance with an embodiment of the present invention. Dashboard UI 600 is displayed for a client, by an application, for monitoring the state of the aforementioned system. With the dashboard UI 600, a state of the system can be monitored, and an operation for monitoring can be executed. The dashboard UI 600 may include components 601a, 601b, 601c, 601d, 601e, and 601f corresponding to resources and/or operations. The components 601a to 601f, respectively, provide display fields 602a, 602b, 602c, 602d, 602e, and 602f for displaying the states of the corresponding resources and operations 603a, 603b, 603c, 603d, 603e, 603f, the operations executed on individual resources. The display fields 602 may display the states of the resources in response to periodic, or regular, API calls. If a user initiates any one of the operations represented by a component 601 from the dashboard 600, a non-periodic, or irregular, API call may be executed.

In the exemplary application, the individual components 601 serve as modules, and timers that invoke the modules may be simultaneously set, thus the timings of regular API calls are likely to synchronize with one another. Therefore, regular API calls may be simultaneously executed, as described above.

However, if API calls are simultaneously executed and a plurality of Hypertext Transfer Protocol (HTTP) requests, one for each API, are simultaneously generated, the number of the HTTP requests may reach a maximum number of HTTP requests that can be simultaneously processed by the browser. In this case, HTTP requests beyond the upper limit may be kept waiting, and a wait state may occur. Specifically, when a plurality of regular APIs are simultaneously executed, execution of an API relating to a resource, which the user is very interested in, may be postponed, prolonging the user's wait time.

In various embodiments, remote APIs may be classified into remote APIs that are regularly called, on the basis of a history of remote API calls that are repeatedly executed (hereinafter referred to as "regular APIs") and remote APIs that are irregularly called, in response to a user initiated operation (hereinafter referred to as "irregular APIs"). In various embodiments, input parameters on regular APIs may be compared with one another to identify parameters representing resources targeted by the regular APIs. Resources targeted by the most recent irregular API may be identified as a resource in which the user is very interested. The priority level of individual resources may be determined such that a resource identified as being a resource in which the user is very interested may be given a high priority level. Accordingly, in a case where executions of a plurality of regular APIs are simultaneously requested, the execution order of these regular APIs may be determined on the basis of the priority level of the resources targeted in each individual regular API.

Figure 2:
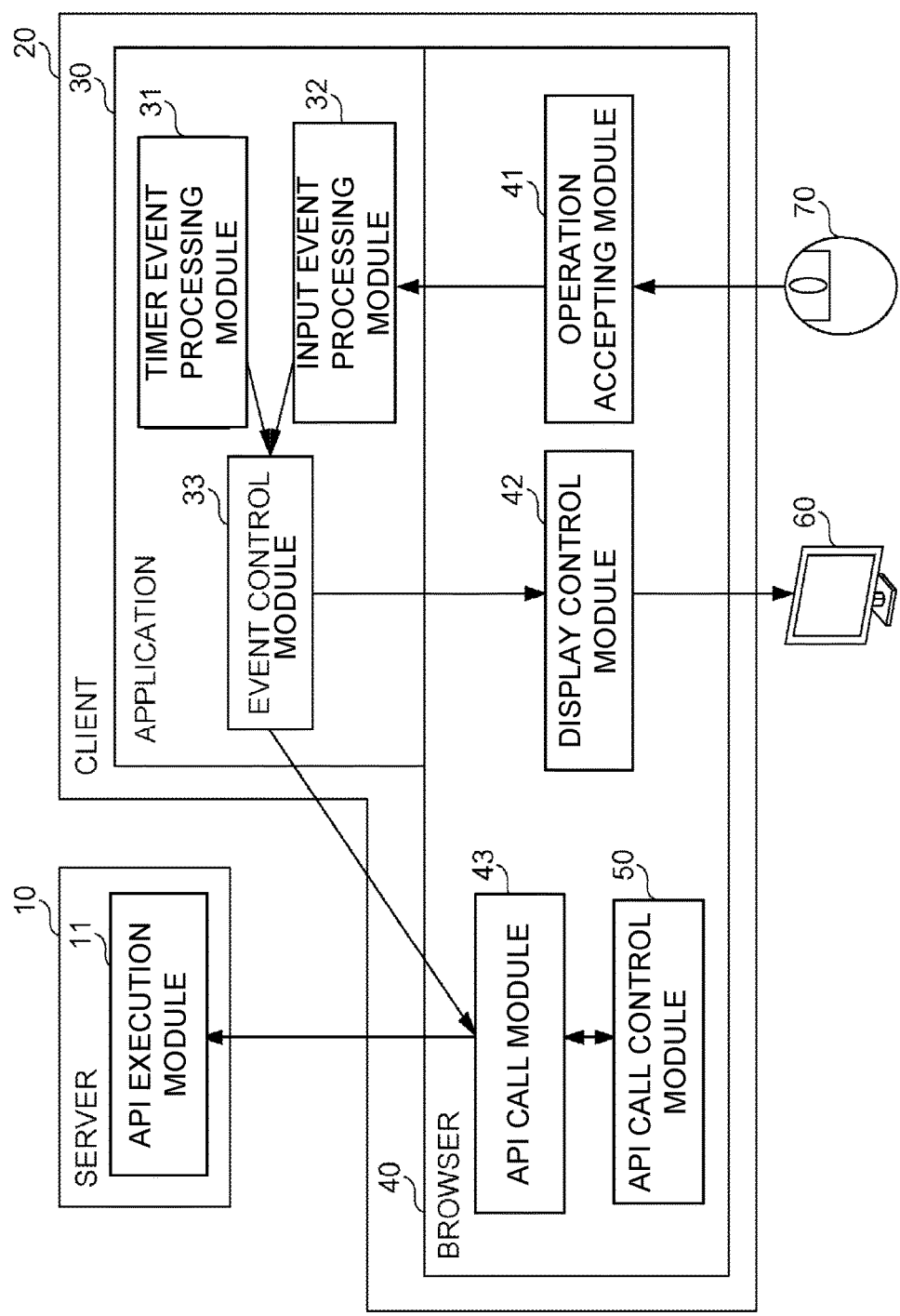
FIG. 2 is a block diagram depicting an exemplary configuration of a client server system, in accordance with an embodiment of the present invention.

FIG. 2 is a block diagram depicting an exemplary configuration of a client server system, in accordance with an embodiment of the present invention. As depicted in FIG. 2, the client server system includes a server 10 and a client 20. In the client 20, an application 30 and a browser 40 operate.

The client server system also includes a display 60 for displaying information and an input device 70 for inputting information.

The server 10 is a computer that executes an API. Specifically, the server 10 includes an API execution module 11. The API execution module 11 executes an API received from the browser 40 of the client 20, and returns a result to the browser 40.

The client 20 is a computer used by a user who receives a service provided by the application 30 via the browser 40. Specifically, the client 20 includes, as functions of the application 30, a timer event processing module 31, an input event processing module 32, and an event control module 33, and also includes, as functions of the browser 40, an operation accepting module 41, a display control module 42, an API call module 43, and an API call control module 50.

When the timer event processing module 31 is notified of the occurrence of a timer event caused by timeout of a preregistered timer, the timer event processing module 31 may notify the event control module 33 of the occurrence.

When the input event processing module 32 is notified of the occurrence of an input event by the operation accepting module 41, the input event processing module 32 may notify the event control module 33 of the occurrence.

The event control module 33 may receive the notification indicating that a timer event has occurred or that an input event has occurred. In accordance with the details of the event, the event control module 33 may request the display control module 42 to display output on the display 60, or may request the API call module 43 to execute an API call.

When the operation accepting module 41 accepts a user's input from the input device 70 and an input event occurs, the operation accepting module 41 notifies the input event processing module 32 of the occurrence.

The display control module 42 may display output to the display 60 in response to a request from the event control module 33.

The API call module 43 may execute an API call to the server 10 in response to a request from the event control module 33.

If a plurality of API calls are simultaneously requested, the API call control module 50 may determine the priority level of the resource targeted by each of the API calls, and may control the API calls executed by the API call module 43 on the basis of that priority level.

Figure 3:
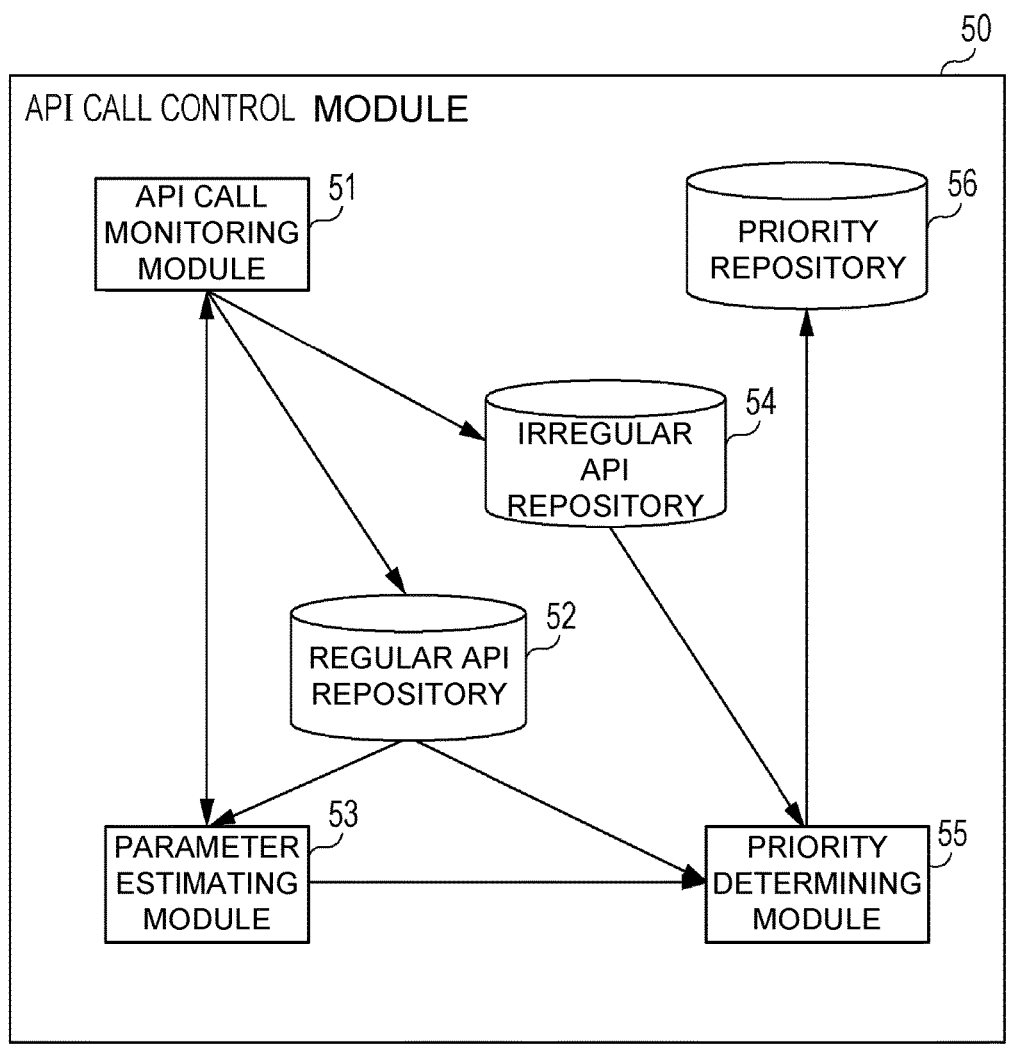
FIG. 3 is a block diagram depicting an exemplary API call control module, in accordance with an embodiment of the present invention.

FIG. 3 is a block diagram depicting an exemplary API call control module 50, in accordance with an embodiment of the present invention. As depicted in FIG. 3, the API call control module 50 includes an API call monitoring module 51, a regular API repository 52, a parameter estimating module 53, an irregular API repository 54, a priority determining module 55, and a priority repository 56.

The API call monitoring module 51 may monitor API calls executed by the API call module 43. Monitoring of API calls may include monitoring of both regular API calls and irregular API calls. Regular API call monitoring may include API call monitoring module 51 monitoring all API calls over a period of time to determine whether or not a regular API call has been executed. If the API call monitoring module 51 determines that a regular API call has been executed, the API call monitoring module 51 may store information about the regular API in the regular API repository 52. If the API call monitoring module 51 detects that an irregular API call has been executed, the API call monitoring module 51 may store information about the irregular API in the irregular API repository 54. In various embodiments, an API call is used as an example of a remote procedure call, and the API call monitoring module 51 is provided as an example of an extracting module configured to extract a regular remote procedure call and an irregular remote procedure call.

The regular API repository 52 may include information about regular APIs obtained through the monitoring of API calls by the API call monitoring module 51.

The parameter estimating module 53 may identify a parameter item representing a resource targeted by an API based on the information about regular APIs included in the regular API repository 52.

In various embodiments, a resource may exemplify data, a parameter item may exemplify information, including but not limited to, a representation of target data or a value. The parameter estimating module 53 may exemplify a module configured to identify a parameter item including target data.

The irregular API repository 54 may include information about irregular APIs obtained through monitoring of API calls by the API call monitoring module 51.

The priority determining module 55 may check, in the information about regular APIs stored in the regular API repository 52, if a parameter item in the irregular API matches a parameter item in the regular API repository 52 that has a value set by the parameter estimating module 53, indicating the parameter item references a resource as the irregular API. The priority determining module 55 may also search, in the information about regular APIs stored in the regular API repository 52, to determine whether any regular API also targets the same resource. The priority determining module 55 may utilize parameter values, representing target resources, set in the parameter items by the parameter estimating module 53, to make the determination. If there is a regular API targeting the same resource as the irregular API, the priority determining module 55 may determine the priority level of the regular APIs so that the regular API targeting the same resource may be given a higher priority.

In various embodiments, a parameter value may exemplify information or a value representing target data, and the priority determining module 55 may exemplify an identifying module configured to identify specific data represented by a value set in a parameter item.

The priority repository 56 may include information about the priority level of individual regular APIs, as determined by the priority determining module 55. The information about the priority level may be referenced by the API call module 43 when executions of a plurality of regular API calls are simultaneously requested, enabling the plurality of regular API calls to be executed in descending order, based on priority level.

The API call monitoring module 51 may record the API calls executed by the API call module 43 over a period of time, and classify each of the API calls as a regular API call or an irregular API call, depending on the pattern of the API calls. The determination may be performed using any known method, for example by using a Fourier transform.

Figure 4:
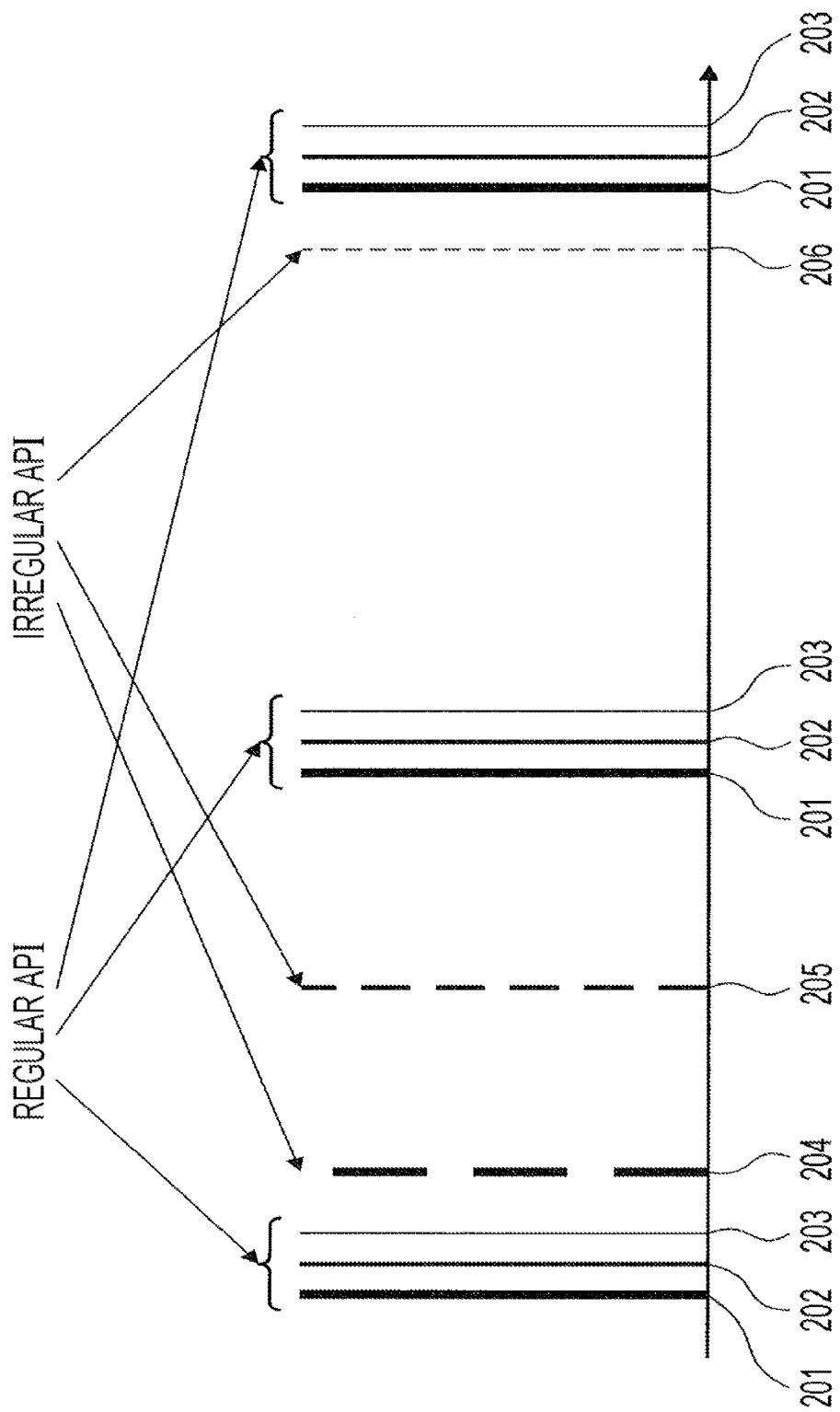
FIG. 4 is a diagram illustrating timings of API calls over a period of time, in accordance with an embodiment of the present invention.

FIG. 4 is a diagram illustrating timings of API calls over a period of time, in accordance with an embodiment of the present invention. In FIG. 4, APIs 201, 202, and 203 are regularly called and are thus determined to be regular APIs. On the other hand, APIs 204, 205, and 206 are irregularly called and are thus determined to be irregular APIs.

In various embodiments, the parameter estimating module 53 may compare the universal record locators (URLs) of the regular APIs or may compare the request content of the regular APIs that are called in close time proximity to each other. Specifically, the parameter estimating module 53 may compare the values set in the items of individual parameters (hereinafter referred to as "parameter items") included in the URLs or request content (hereinafter the values are referred to as "parameter values"). If the number of regular API calls having the same parameter items in which different parameter values are set exceeds a threshold, that parameter item is identified as a parameter item representing a resource.

FIG. 5 depicts an exemplary API parameter table, in accordance with an embodiment of the present invention. The exemplary API parameter table includes parameter items "parameter 1", "parameter 2", "parameter 3", and "parameter 4", shown in a heading portion of the API parameter table. The parameter values A1, A2, A3, A4, B1, B2, B3, B4, C1, C2, C4 for each parameter item are shown in the data portion of the API parameter table. In the exemplary API parameter table, the first to fourth rows of the data portion represent regular API calls in which only the parameter values A2, B2, C2, for parameter item "parameter 2" are different. The parameter value for parameter item "parameter 2" is omitted in the fourth row. In an exemplary embodiment, the first to fourth rows of the data portion of the API parameter table represent more than one hundred regular API calls. An exemplary threshold for the number of regular API calls needed to identify a parameter item representing a resource is 100, therefore parameter item "parameter 2" represents a resource. Alternately, the exemplary fifth and sixth rows of the data portion of the API parameter table represent regular API calls in which the parameter values A3 and B3 for parameter item "parameter 3" differ. However, in this example, this merely represents two regular API calls, well below the exemplary threshold of 100 API calls needed to identify a parameter item representing a resource. Therefore, parameter item "parameter 3" is not identified as representing a resource.

FIG. 6 depicts exemplary API parameter items and exemplary parameter values, in accordance with an embodiment of the present invention. It is assumed that the exemplary API parameter items and exemplary parameter values depicted in FIG. 6 are included in regular APIs that are called in close time proximity to each other over a period of time. The exemplary parameter item, "collectionId", is the only parameter item in which different parameter values are set, and as such, is the only parameter item identified as representing a resource.

In various embodiments, if an irregular API is called, the resource targeted by the irregular API may be considered to be of interest to the user initiating the irregular API and the priority level of subsequent regular API targeting the same resource may be increased.

Figure 7:
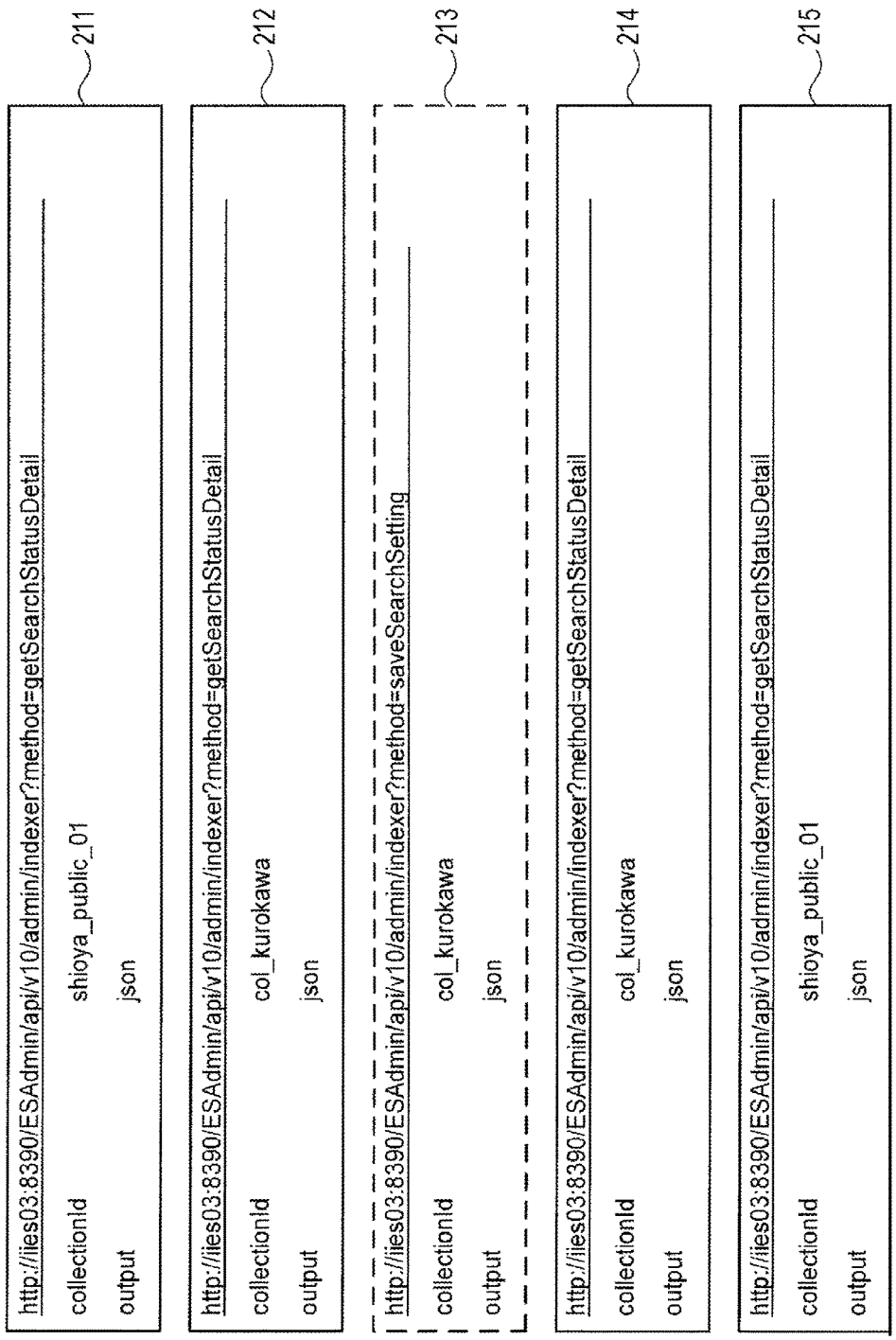
FIG. 7 depicts exemplary API calls, in accordance with an embodiment of the present invention.

FIG. 7 depicts exemplary API calls 211, 212, 213, 214, 215, in accordance with an embodiment of the present invention. As depicted in FIG. 7, APIs 211 and 212 are regular APIs being called. In this example, the priority level of the exemplary regular APIs 211 and 212 are set as "average." Exemplary irregular API 213 is called after exemplary regular APIs 211 and 212, but before exemplary regular APIs 214 and 215. The exemplary irregular API 213 has set parameter value "col_kurokawa" in the parameter item "collectionId" that has been previously identified as representing a resource. The resource "col_kurokawa" for parameter item "collectionId" may be identified as a resource that is of interest to the user, and as such, any subsequent regular APIs, for example 214, 215, that may be simultaneously called thereafter, may have their priority level increased, if the parameter item "collectionId" has a parameter value of "col_kurokawa." In the exemplary API calls of FIG. 7, regular API call 214 may have its priority level increased, for example, to "high."

In the client 20, the event control module 33 may be notified by the timer event processing module 31 if a timer event has occurred, and may be notified by the input event processing module 32 if an input event has occurred. In accordance with the details of the timer event or input event, the event control module 33 may request the API call module 43 to execute an API call. The API call module 43 may execute an API call to the server 10. In the server 10, the API execution module 11 may execute the API called from the client 20.

The client server system executes the above-described operation. In various embodiments, the API call module 43 may be controlled by the API call control module 50 when executing an API call.

Figure 8:
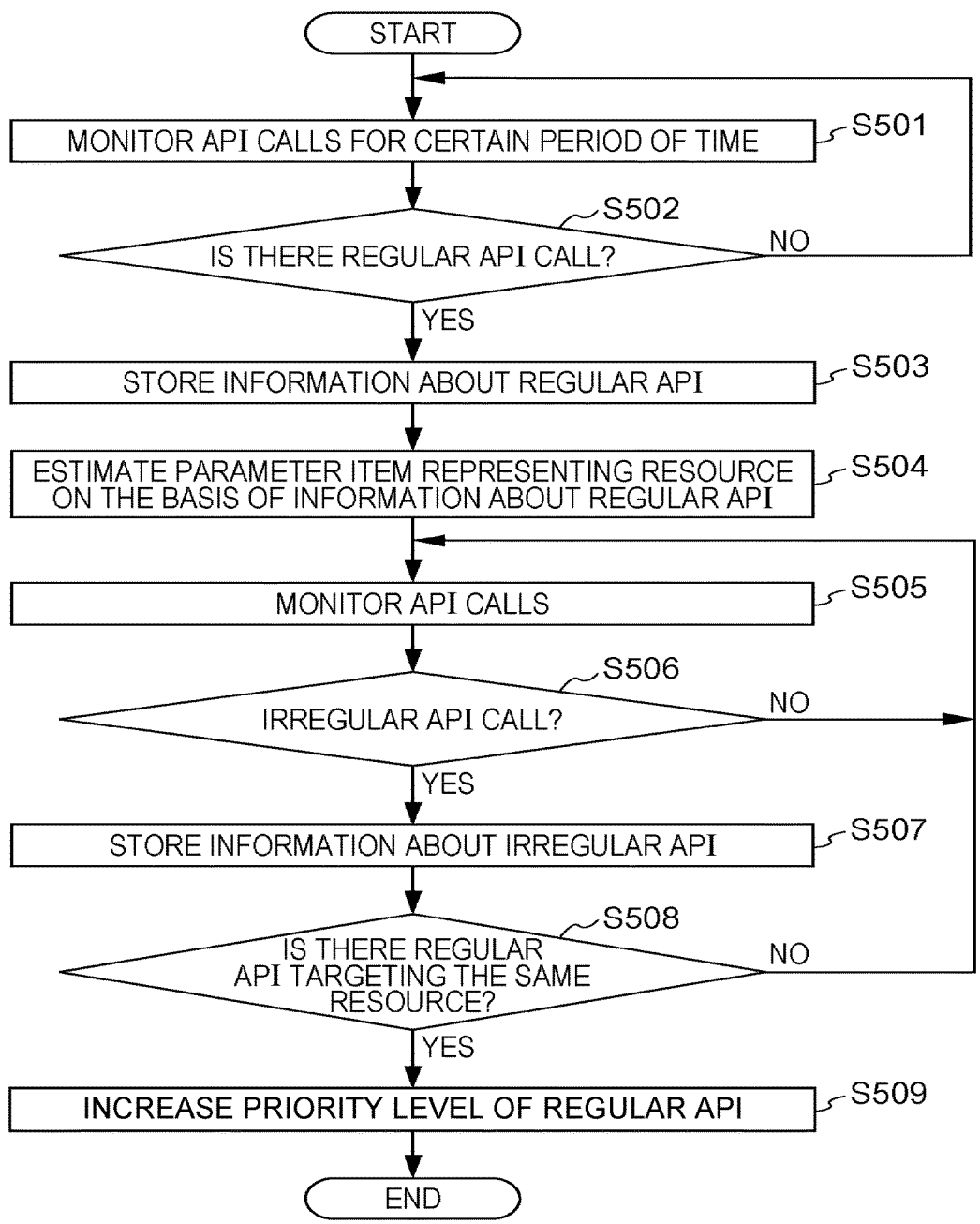
FIG. 8 is a flowchart illustrating the operation of the API call control module, in accordance with an embodiment of the present invention.

FIG. 8 is a flowchart illustrating the operation of the API call control module 50, in accordance with an embodiment of the present invention. The operation starts, for example, when the exemplary dashboard depicted in FIG. 1 is displayed.

As illustrated in FIG. 8, in the API call control module 50, the API call monitoring module 51 executes a regular API call monitoring process. The API call monitoring module 51 may monitor API calls executed by the API call module 43 over a period of time (at S501). The API call monitoring module 51 may determine whether or not there is a regular API call among the API calls monitored over that period of time (at S502). If the API call monitoring module 51 determines that there is not a regular API call (at S502), the API call monitoring module 51 repeats, at S501. If the API call monitoring module 51 determines that there is a regular API call (at S502), the API call monitoring module 51 may store information about the regular API in the regular API repository 52 (at S503). The API call monitoring module 51 may notify the parameter estimating module 53 that a regular API call has been added to the regular API repository 52. The parameter estimating module 53 may refer to the information stored in the regular API repository 52 to identify any parameter items representing a resource (at S504). The parameter estimating module 53 may notify the API call monitoring module 51 when identification of a parameter item representing a resource has completed. The parameter estimating module 53 may also notify the priority determining module 55 with the identified parameter item representing a resource.

The API call monitoring module 51 also monitors API calls executed by the API call module 43 (at S505) for an irregular API call. The API call monitoring module 51 may determine whether a monitored API call is an irregular API call (at S506). If the API call monitoring module 51 determines that the monitored API call is not an irregular API call (at S506), the API call monitoring module 51 continues monitoring (at S505). If the API call monitoring module 51 determines that the monitored API call is an irregular API call (at S506), the API call monitoring module 51 may store information about the irregular API in the irregular API repository 54 (at S507). The priority determining module 55 may determine if a regular API targets the same resource as the resource targeted by the irregular API (at S508). The priority determining module 55 may utilize the information about irregular APIs stored in the irregular API repository 54, including the parameter value set in the parameter item, identified by the parameter estimating module 53 as representing a resource. The priority determining module 55 may also utilize information about regular APIs stored in the regular API repository 52 to determine if a regular API has the same parameter value set for the same parameter item. If the priority determining module 55 determines (at S508)

that there is not a regular API targeting the same resource targeted by the irregular API, the priority determining module 55 may instruct the API call monitoring module 51 to return to monitoring API calls, at S505. On the other hand, if the priority determining module 55 determines (at S508) that there is a regular API targeting the same resource targeted by the irregular API, the priority determining module 55 may increase the priority level of the regular API (at S509).

While the operation of the client server system has been described, the priority level may be adjusted after a priority level is determined in the above-described manner. In various embodiments, the priority level may be reset after a certain period time has elapsed. In other embodiments, a coefficient for preventing bias of the priority level may be introduced. Here, the bias of the priority level may occur if processes increasing the priority level of a particular regular API are concentrated in time, and as a result, the priority level of the regular API becomes especially high. To prevent the occurrence of such a situation, the amount of increase in priority level may be compared to the previous increases.

As described above, in various embodiments of the invention, regular and irregular API calls may be extracted from among the API calls from the client 20 to the server 10, a parameter item representing a resource targeted by the API may be identified based on the regular API. If the resource targeted by the irregular API, as specified by the parameter value set for the parameter item in the irregular API, is also targeted by a regular API, the priority level of the regular API targeting that resource is increased. Therefore, among regular API calls that are simultaneously executed, the regular API call, in which the user is very interested, can be given higher priority without using knowledge of the application executing the API.

In various embodiments, the priority level of a regular API call is determined on the basis of a parameter item representing a resource estimated through the regular API call and a parameter value set in that parameter item in an irregular API, but the present invention is not limited thereto. The priority level of a regular API call may be determined by first using information obtained through a regular API call, and second using information obtained through an irregular API. The first information and the second information may be information of the same type or different types.

In various embodiments, the priority level of a regular API call may be determined under the assumption that there is an upper limit for the number of APIs that can be simultaneously called by the browser 40. However, the priority level of a process based on a regular API call may be determined under the assumption that there is not an upper limit for the number of APIs that can be simultaneously called by the browser 40. That is, the browser 40 may execute all requested regular API calls, and processes based on the regular API calls may be executed on the server 10 side in accordance with the priority level of the API.

Further, in various embodiments, the priority level of a regular API call or a process based on the regular API call may be determined, but the present invention is not limited thereto. The mode of a regular API call, or a process based on the regular API call, may be determined such that a regular API targeting a certain resource is distinguished from other regular APIs. For example, a process may be newly executed for a call of a regular API targeting a certain resource, and the result of the already executed process may be used for a call of a regular API targeting another resource. More generally, it can be said that merely the mode of a regular API call or a process based on the regular API call may be determined. In the exemplary embodiment, the priority determining module 55 is provided as an example of a determining module configured to determine either of a mode of a regular remote procedure call or a mode of a process based on the regular remote procedure call.

Figure 9:
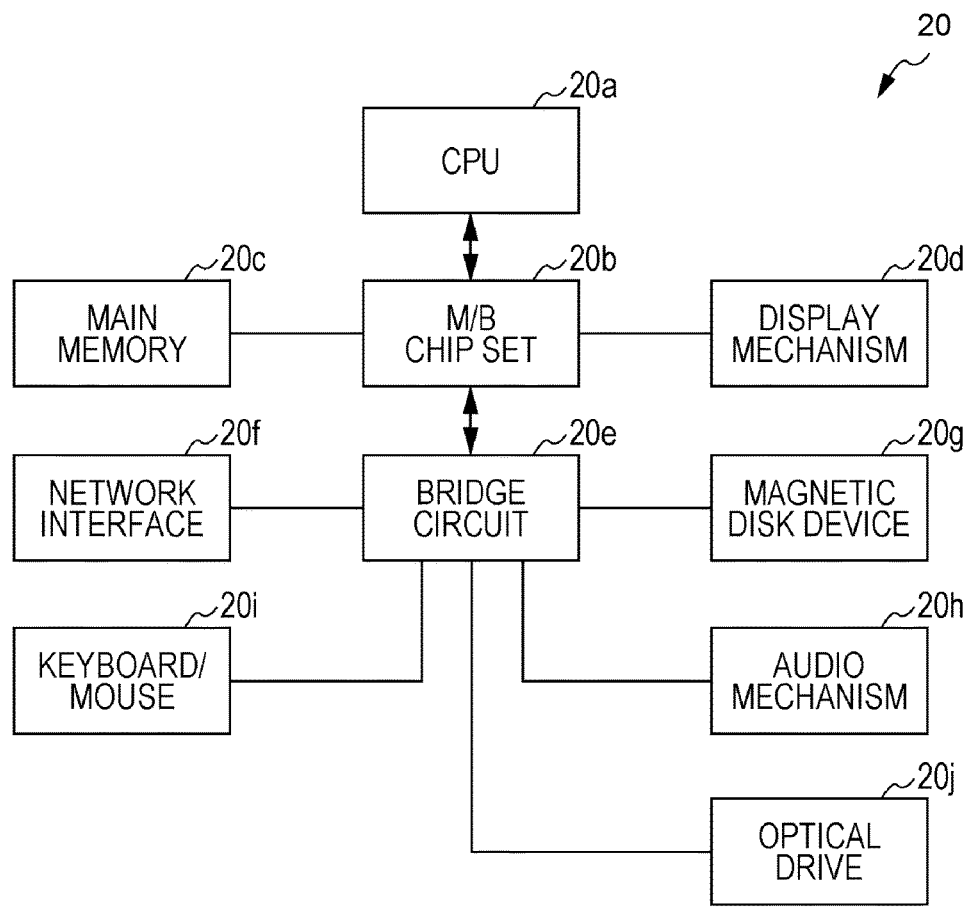
FIG. 9 is a block diagram depicting an exemplary hardware configuration of a client, in accordance with an embodiment of the present invention.

FIG. 9 is a block diagram depicting an exemplary hardware configuration of a client 20, in accordance with an embodiment of the present invention. As shown in FIG. 9, the client 20 includes a central processing unit (CPU) 20*a* serving as an operation unit, a motherboard (M/B) chip set 20*b*, a main memory 20*c* connected to the CPU 20*a* via the M/B chip set 20*b*, and a display mechanism 20*d* (corresponding to the display 60 shown in FIG. 2) connected to the CPU 20*a* via the M/B chip set 20*b*. The M/B chip set 20*b* is connected to a network interface 20*f*, a magnetic disk device (HDD) 20*g*, an audio mechanism 20*h*, a keyboard/mouse 20*i* (corresponding to the input device 70 illustrated in FIG. 2), and an optical drive 20*j* via a bridge circuit 20*e*.

In FIG. 9, the elements are interconnected via buses. For example, the CPU 20*a* and the M/B chip set 20*b*, and the M/B chip set 20*b* and the main memory 20*c* are interconnected via a CPU bus. The M/B chip set 20*b* and the display mechanism 20*d* may be interconnected via an accelerated graphics port (AGP). In a case where the display mechanism 20*d* includes a video card compatible with PCI Express, the M/B chip set 20*b* and the video card are interconnected via a PCI Express (PCIe) bus. To establish a connection with the bridge circuit 20*e*, PCI Express may be used for the network interface 20*f*. For the magnetic disk device 20*g*, serial AT attachment (ATA), ATA for parallel transfer, or peripheral components interconnect (PCI) may be used. Further, for the keyboard/mouse 20*i* and the optical drive 20*j*, a universal serial bus (USB) may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Here, the present invention may be implemented using only hardware or only software. Also, the present invention may be implemented using both hardware and software. Further, the present invention may be implemented as a computer, a data processing system, or a computer program. The computer program may be provided by storing it in a computer-readable medium. Examples of the medium include an electronic medium, a magnetic medium, an optical medium, an electromagnetic medium, an infrared or semiconductor system (device or apparatus), or a transmission medium. Examples of the computer-readable medium include a semiconductor storage device, a solid-state storage device, a magnetic tape, a removable computer diskette, a random access memory (RAM), a read only memory (ROM), a rigid magnetic disk, and an optical disc. Examples of the optical disc at the current time include a compact disc read only memory (CD-ROM), a compact disc read/write (CD-R/W), and a digital versatile disc (DVD).

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for controlling a remote procedure call from a client computer to a server computer, the method comprising:

extracting, by a client computer, a periodic remote procedure call from among a plurality of remote procedure calls from the client computer;

extracting, by the client computer, a non-periodic remote procedure call from among the plurality of remote procedure calls from the client computer;

identifying, by the client computer, a first information associated with the extracted periodic remote procedure call, wherein the first information is an item whose value is determined to represent data targeted by the periodic remote procedure call;

identifying, by the client computer, a second information associated with the extracted non-periodic remote procedure call, wherein the second information is a targeted data value of the item; and setting, by the client computer, a priority level used to select for execution of the periodic remote procedure call, based on the first information and the second information.

2. The method according to claim 1, further comprising: selecting, by the client computer, the periodic remote procedure call to execute, from among the plurality of remote procedure calls, based on the priority level.

3. The method according to claim 1, wherein identifying, by the client computer a first information further comprises:
extracting, by the client computer, an item associated with one or more extracted periodic remote procedure calls;
extracting, by the client computer, one or more values associated with the extracted item associated with the one or more extracted periodic remote procedure calls; and
based on determining that the extracted values associated with the extracted item associated with the one or more extracted periodic remote procedure calls are not equal:
identifying, by the client computer, the extracted values as targeted data values; and
identifying, by the client computer, the item whose value is determined to represent a targeted data value.

4. The method according to claim 3, wherein identifying, by the client computer a second information further comprises:
based on determining, by the client computer, that the identified item is associated with the extracted non-periodic remote procedure call, extracting, by the client computer, the targeted data value of the item.

5. The method according to claim 1, wherein setting the priority level for the periodic remote procedure call based on the first information and the second information further comprises:
determining, by the client computer, if the periodic remote procedure call has the same targeted data value for the same associated item as the non-periodic remote procedure call.

6. The method according to claim 1, wherein the priority level is set in one or more of:
the periodic remote procedure call; and
a process based on the periodic remote procedure call.

7. The method according to claim 1, wherein the priority level set for the periodic remote procedure call distinguishes that periodic remote procedure call from the plurality of remote procedure calls from the client computer.

8. A computer program product for controlling a remote procedure call from a client computer to a server computer, the server computer including at least one physical processor and memory, the computer program product comprising one or more computer readable storage medium and program instructions stored on at least one of the one or more computer readable storage medium, the program instructions comprising:
program instructions to extract, by a client computer, a periodic remote procedure call from among a plurality of remote procedure calls from the client computer;
program instructions to extract, by the client computer, a non-periodic remote procedure call from among the plurality of remote procedure calls from the client computer;
program instructions to identify, by the client computer, a first information associated with the extracted periodic remote procedure call, wherein the first information is an item whose value is determined to represent data targeted by the periodic remote procedure call;
program instructions to identify, by the client computer, a second information associated with the extracted non-periodic remote procedure call, wherein the second information is a targeted data value of the item; and
program instructions to set, by the client computer, a priority level used to select for execution of the periodic remote procedure call, based on the first information and the second information.

9. The computer program product according to claim 8, further comprising:
program instructions to select, by the client computer, the periodic remote procedure call to execute, from among the plurality of remote procedure calls, based on the priority level.

10. The computer program product according to claim 8, wherein program instructions to identify, by the client computer a first information further comprises:
program instructions to extract, by the client computer, an item associated with one or more extracted periodic remote procedure calls;
program instructions to extract, by the client computer, one or more values associated with the extracted item associated with the one or more extracted periodic remote procedure calls; and
based on determining that the extracted values associated with the extracted item associated with the one or more extracted periodic remote procedure calls are not equal:
program instructions to identify, by the client computer, the extracted values as targeted data values; and
program instructions to identify, by the client computer, the item whose value is determined to represent a targeted data value.

11. The computer program product according to claim 10, wherein program instructions to identify, by the client computer a second information further comprises:
based on determining, by the client computer, that the identified item is associated with the extracted non-periodic remote procedure call, program instructions to extract, by the client computer, the targeted data value of the item.

12. The computer program product according to claim 8, wherein program instruction to set the priority level for the periodic remote procedure call based on the first information and the second information further comprises:
program instructions to determine, by the client computer, if the periodic remote procedure call has the same targeted data value for the same associated item as the non-periodic remote procedure call.

13. The computer program product according to claim 8, wherein the priority level is set in one or more of:
the periodic remote procedure call; and
a process based on the periodic remote procedure call.

14. The computer program product according to claim 8, wherein the priority level set for the periodic remote procedure call distinguishes that periodic remote procedure call from the plurality of remote procedure calls from the client computer.

15. A computer system for controlling a remote procedure call from a client computer to a server computer, the computer system comprising one or more processors including at least one physical processor, one or more computer readable memories including at least one physical memory, one or more computer readable storage medium, and program instructions stored on at least one of the one or more storage medium for execution by at least one of the one or more processors via at least one of the one or more memories, the program instructions comprising:

program instructions to extract, by a client computer, a periodic remote procedure call from among a plurality of remote procedure calls from the client computer;

program instructions to extract, by the client computer, a non-periodic remote procedure call from among the plurality of remote procedure calls from the client computer;

program instructions to identify, by the client computer, a first information associated with the extracted periodic remote procedure call, wherein the first information is an item whose value is determined to represent data targeted by the periodic remote procedure call;

program instructions to identify, by the client computer, a second information associated with the extracted non-periodic remote procedure call, wherein the second information is a targeted data value of the item; and program instructions to set, by the client computer, a priority level used to select for execution of the periodic remote procedure call, based on the first information and the second information.

16. The computer system according to claim 15, further comprising:

program instructions to select, by the client computer, the periodic remote procedure call to execute, from among the plurality of remote procedure calls, based on the priority level.

17. The computer system according to claim 15, wherein program instructions to identify, by the client computer a first information further comprises:

program instructions to extract, by the client computer, an item associated with one or more extracted periodic remote procedure calls;

program instructions to extract, by the client computer, one or more values associated with the extracted item associated with the one or more extracted periodic remote procedure calls; and based on determining that the extracted values associated with the extracted item associated with the one or more extracted periodic remote procedure calls are not equal:

program instructions to identify, by the client computer, the extracted values as targeted data values; and program instructions to identify, by the client computer, the item whose value is determined to represent a targeted data value.

18. The computer system according to claim 17, wherein program instructions to identify, by the client computer a second information further comprises:

based on determining, by the client computer, that the identified item is associated with the extracted non-periodic remote procedure call, program instructions to extract, by the client computer, the targeted data value of the item.

19. The computer system according to claim 15, wherein program instruction to set the priority level for the periodic remote procedure call based on the first information and the second information further comprises:

program instructions to determine, by the client computer, if the periodic remote procedure call has the same targeted data value for the same associated item as the non-periodic remote procedure call.

20. The computer system according to claim 15, wherein the priority level set for the periodic remote procedure call distinguishes that periodic remote procedure call from the plurality of remote procedure calls from the client computer.

\* \* \* \* \*